United States Patent
Tu

(10) Patent No.: US 9,560,259 B2
(45) Date of Patent: Jan. 31, 2017

(54) IMAGE PROCESSING SYSTEM WITH BLUR MEASUREMENT AND METHOD OF OPERATION THEREOF

(71) Applicant: Sony Corporation, Tokyo (JP)

(72) Inventor: Xue Tu, San Jose, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/318,390

(22) Filed: Jun. 27, 2014

(65) Prior Publication Data

US 2015/0381876 A1    Dec. 31, 2015

(51) Int. Cl.
*H04N 5/232* (2006.01)
*G03B 13/36* (2006.01)
*G02B 7/36* (2006.01)
*G06T 7/00* (2006.01)

(52) U.S. Cl.
CPC ........... *H04N 5/23212* (2013.01); *G02B 7/36* (2013.01); *G03B 13/36* (2013.01); *G06T 7/0059* (2013.01); *G06T 7/0051* (2013.01); *G06T 7/0085* (2013.01)

(58) Field of Classification Search
CPC ......... H04N 5/2312; G02B 7/36; G01S 3/782; G01S 3/7864; G06T 7/0051; G06T 7/0079–7/0095; G06T 5/002; G06T 5/003; G06T 5/40; G06T 2207/20076; G06T 2207/20081; G06T 2207/20116; G06T 2207/20124; G06T 2207/20136; G06T 2207/20192; G06K 9/4604; G06K 9/4638; G06K 9/4661; G06K 9/56; G06K 9/6202; G06K 9/6204; G06K 9/6205; G06K 9/6209; G06K 9/621; G06K 9/6212; G06K 9/6277; G06K 2009/484; G06K 2009/485; G06K 2009/487
See application file for complete search history.

(56) References Cited

U.S. PATENT DOCUMENTS

| | | | |
|---|---|---|---|
| 5,710,829 A * | 1/1998 | Chen et al. | 382/173 |
| 8,027,582 B2 * | 9/2011 | Li | G06T 7/0069 348/349 |
| 8,036,495 B2 | 10/2011 | Takeshima et al. | |
| 8,098,948 B1 | 1/2012 | Tzur et al. | |
| 8,249,357 B2 | 8/2012 | Yitzhaky et al. | |
| 8,472,744 B2 | 6/2013 | Hong | |
| 8,577,101 B2 | 11/2013 | Avila | |
| 2007/0110319 A1 * | 5/2007 | Wyatt et al. | 382/199 |
| 2011/0273730 A1 | 11/2011 | Loce et al. | |
| 2012/0314960 A1 * | 12/2012 | Tay | 382/199 |
| 2014/0080428 A1 | 3/2014 | Rhoads et al. | |
| 2014/0132791 A1 * | 5/2014 | Tzur | H04N 5/23212 348/222.1 |
| 2014/0233853 A1 * | 8/2014 | Fransson et al. | 382/173 |
| 2014/0270346 A1 * | 9/2014 | Tsin et al. | 382/103 |

FOREIGN PATENT DOCUMENTS

| | | |
|---|---|---|
| WO | 9419493 A1 | 9/1994 |
| WO | 2007057808 A2 | 5/2007 |

* cited by examiner

Primary Examiner — Roberto Velez
Assistant Examiner — Quan Pham
(74) Attorney, Agent, or Firm — Haverstock & Owens LLP

(57) ABSTRACT

An image processing system and method of operation includes: an image processing device; an image capture module for capturing a source image on the image processing device; an assessment module for detecting an edge of the source image, and measuring an edge width measure of the edge; and a retrieving module for retrieving a depth of field from the edge width measure.

18 Claims, 6 Drawing Sheets

IMAGE PROCESSING SYSTEM WITH BLUR MEASUREMENT AND METHOD OF OPERATION THEREOF

TECHNICAL FIELD

The present invention relates generally to image processing systems, and more particularly to an image processing system with automatic focus system.

BACKGROUND ART

The deployment of high quality images to cameras, medical devices, smart phones, tablet computers, and other information devices with screens has grown tremendously in recent years. The wide variety of information devices supporting image processing and image understanding requires the ability to assess images to estimate a blur measurement for a region of input images and to restore the images.

Focal blur, or out-of-focus blur, in images and videos, occurs when objects in the scene are placed out of the focal range of the camera. In many cases it is desirable to remove the blur and restore the original scene faithfully. As objects at varying distances are differently blurred in the images, accurate blur measurement is essential.

The measurement of the focal blur has also become an important topic in many other applications, such as restoring the blurred background part of images and videos, digital auto-focusing systems and 2-D to 3-D image conversion. In an image processing system, such as an optical lens camera, the camera tries to assess whether images is sharp or blur under current lens setting, and tries to find the correct lens setting for the scene.

Thus, a need still remains for an image processing system that can create good quality images with sharp step edges. Such images must be provided across a wide range of devices having different sizes, resolutions, memory capacity, compute power, and image quality.

In view of the increasing demand for providing high quality sharp images on the growing spectrum of intelligent imaging devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have long been sought but prior developments have not taught or suggested any solutions and, thus, solutions to these problems have long eluded those skilled in the art.

DISCLOSURE OF THE INVENTION

The present invention provides a method of operation of an image processing system including: providing an image processing device; receiving a source image on the image processing device; detecting an edge of the source image; calculating an edge width measure of the edge; and retrieving a depth from the edge width measure.

The present invention provides an image processing system including: an image processing device; an image capture module for capturing a source image on the image processing device; an assessment module for detecting an edge of the source image, and measuring an edge width measure of the edge; and a retrieving module for retrieving a depth of field from the edge width measure.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
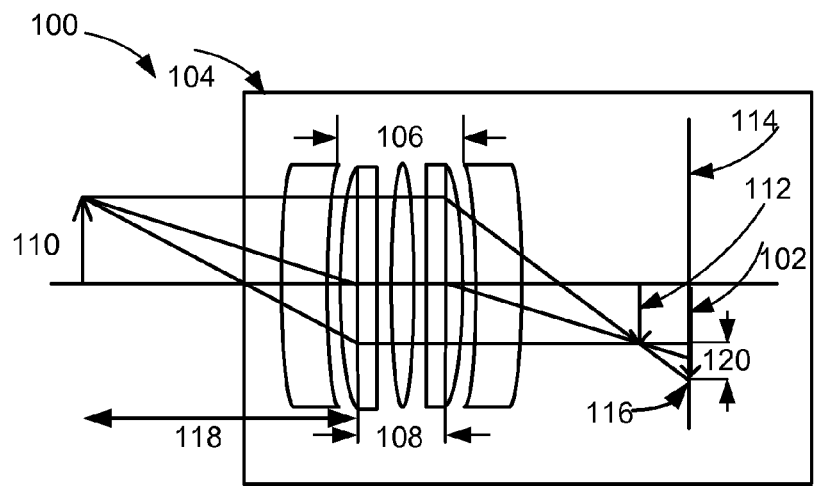
FIG. 1 is a lens system of an image processing system with an automatic focus system in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGS. Where multiple embodiments are disclosed and described, having some features in common, for clarity and ease of illustration, description, and comprehension thereof, similar and like features one to another will ordinarily be described with like reference numerals.

The term "module" referred to herein can include software, hardware, or a combination thereof in the present invention in accordance with the context used. The term "adjacent" means two or more elements are next to one another.

The term "connected" means that two or more pixels or segments are next to one another with no intervening elements. The term "directly connected" means that two or more pixels or segments are in direct contact with one another with no intervening elements.

In an image processing system, an image processing device can adjust a lens system thereof to an appropriate lens setting to capture a sharp image of a scene or an object. The image processing device can include a camera, video imaging system, or similar optical devices. The camera can have an automatic focus system, which assesses whether an image is sharp or blur under the current lens setting. A blur measurement is calculated and provided to the automatic focus system to adjust the lens system to the correct lens setting for the scene or object.

The lens system of the camera includes an optical lens or assembly of lenses used in conjunction with the camera body and mechanism to make images of objects either on photographic film or on other media capable of storing an image chemically or electronically. The lens system can include plurality of the lens settings, which are combinations of positions of the assembly of lenses. Each of the lens settings has a focus point, where a sharp image can be captured at, regard to the object and the distance thereof. The focus point of the lens setting moves when the distance of the object changes. When the focus point falls in front of or behind an optical sensor where the source image captured, the source image has blurriness. The measure of the blurriness depends on the distance between the optical sensor and the focus point. The blurriness shrinks when the focus point approaches the optical sensor. The blurriness is minimized when the focus point aligned with the optical sensor. The camera can adjust the lens system to the appropriate lens setting to realign the focus point to the optical sensor to capture a sharp image.

The camera featured with the automatic focus system first assesses whether a source image is sharp or blur under the current lens setting, and then locates and adjusts to the appropriate lens setting to capture a sharp image. One of the essential steps of assessing images is measuring a blur extent parameter to infer depth. Embodiment of this invention introduces a new method to measure blur extent parameter.

The blur extent parameter is the smear size of a blurred image of a point object in the original source image. In blurred images, sharp edges expand to small patches where transition areas become much larger. The blurring process can be modeled as convolution of a sharp step edge and point spread function, wherein convolution is a mathematic operation similar to cross-correlation on two functions producing a third function.

The point spread function (PSF), describes the response of an imaging system to a point source or point object. A more general term for the PSF is an impulse response of an optical system. The PSF in many contexts can be thought of as the extended blob in an image that represents an unresolved object. The degree of spreading or blurring of the point object is a measure for the quality of an imaging system. The image of a complex object can be seen as a convolution of the true object and the PSF.

Blurring is usually modeled as Gaussian blurring. Therefore, the problem of blurring measurement is to identify the Gaussian point spread function. The variance (i.e., second central moment) of point spread function indicates the blur extent parameter. Embodiment of the current invention resolves the blurring problem by directly assesses the variance. The convolution between a step edge and point spread function results in a line spread function, and the variance (or second central moment) is proportional to the variance of point spread function. Embodiments of the invention propose a method to directly measure the variance of the line spread function.

First, a Canny edge detector is run to detect the main edge points in the source image, and the edge direction is calculated at each of the main edge points. The Canny edge detection is a technique utilizing an algorithm named for its inventor, wherein the algorithm is applied to an image file to detect edges.

On directions perpendicular to the detected main edges, image pixels are interpolated and a gradient profile of the interpolated pixels is calculated. An image gradient is a directional change in the intensity or color of the source image. The gradient profile is a one dimensional profile along the gradient direction of the zero-crossing pixels in the images. The gradient profile is then smoothed by eliminating small gradient values less than a threshold.

The variance, or the second central moment, of the smoothed gradient profile is calculated to serve as the blur measurement. This blur measurement can be directly used to infer depth from a single image or used to evaluate blur difference from two images and to infer depth further.

Each camera has stored pre-calculated blur measurements with regard to the lens settings. According to the blur measurement of the source image, the image processing system can retrieve the appropriate lens setting having the least blur measurement and automatically adjust the lens system to the appropriate lens setting to capture the sharp image of the object.

Referring now to FIG. 1, therein is shown a lens system of an image processing system 100 with an automatic focus system in an embodiment of the present invention. The image processing system 100 can include a source image 102, such as a blur image, captured on an image processing device 104, such as a camera. The image processing device 104 can include a lens system 106 with plurality of lens settings 108.

The image processing device 104 is a component for receiving the source image 102. The image processing device 104 can include a camera, video imaging system, or similar optical devices. The image processing device 104 can include a computing device that can receive the source image 102 from a storage device, a network device, or a combination thereof.

The source image 102 can be a picture of an object 110 or a scene with various intensities. The source image 102 can be color, monochromatic, or a combination thereof. The image processing device 104 having the lens system 106 can adjust the lens setting 108 to an appropriate position to capture a sharp step image 112 for displaying on a display device 114. An image sensor 116 is included in the image processing device 104. The image processing device 104 can embed the display device 114, or can be coupled to an external display device with a communication path.

The lens system 106 can have plurality lens settings 108. The object 110 is placed in front of the lens system 106 at a distance 118. The source image 102 of the object 110 is captured by the image sensor 116 and can be processed and displayed on the display device 114. If the lens system 106 is not appropriately positioned, the sharp step image 112 is produced in front or behind the image sensor 116. The source image 102 captured by the image sensor 116 and displayed on the display device 114 bas a blurriness 120. The magnitude of the blurriness 120 depends on the distance 118. When the object 110 moves, the distance 118 changes and the blurriness 120 varies. The embodiment of this invention is regarding the same object 110 at the same distance 118. When the object is changed or moved, the lens system 106 needs to re-adjust.

By adjusting the lens system 106 to the appropriate lens setting 108, the image sensor 116 can sense and capture the sharp step image 112 and the sharp step image 112 can be displayed on the display device 114 without the blurriness 120. The display device 114 is an electrical component for displaying information. For example, the display device 114 can include a monitor, screen, video display, or a combination thereof.

Although the image processing device 104 and the display device 114 are present as a single device, it is understood that the image processing device 104 and the display device 114 can be implemented as two separate devices. For example, the image processing device 104 can include an integral monitor performing as the display device 114, such as a camera with a display screen.

Figure 2:
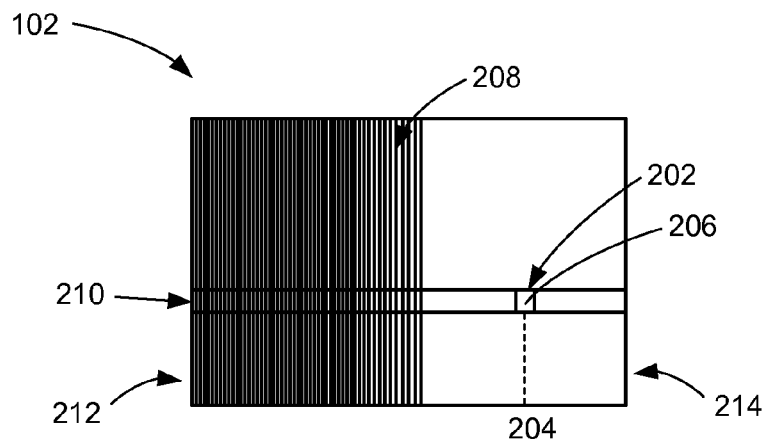
FIG. 2 is an example of the source image of FIG. 1.

Referring now to FIG. 2 therein is shown an example of the source image 102 of FIG. 1. The source image 102 has source pixels 202, which are individual graphical elements can be produced by the image processing device 104 and displayed on the display device 114 of FIG. 1. The source pixels 202 can have characteristics including a source pixel location 204 and source pixel intensity 206.

The source image 102 can be provided in a variety of ways. For example, the source image 102 can be directly formed by the lens system 106 of FIG. 1. In another example, the source image 102 can be received from a remote system via a file storage device, a network connection, or a combination thereof.

The source image 102 can have the blurriness 120 of FIG. 1 over the entire image. Some of the blurriness 120 can be small and invisible, for example, the blurriness 120 in the dark section and bright section are very small. However, the blurriness 120 in a blur step edge 208 is significantly visible.

The source pixel intensity 206 represents the brightness of the source pixel 202. The brighter source pixels 202 have greater values of the source pixel intensities 206. For example, a darker source pixel has lower source pixel intensity 206 than a brighter source pixel. The source pixel intensity 206 is variable. In color image systems, a color is typically represented by three or four component intensities such as red, green, and blue, or cyan, magenta, yellow, Each of the source pixel 202 represents a digitized source image has the source pixel intensity 206 describing how bright that source pixel 206 is, and/or what color it should be. In the simplest case of binary images, the source pixel intensity 206 is a 1-bit number indicating either foreground or background. For a grayscale images, the source pixel intensity 206 is a single number that represents the brightness of the pixel. The most common source pixel intensity format is the byte image, where this non-unit number is stored as an 8-bit integer giving a range of possible values from 0 to 255. Typically zero is taken to be black, and 255 is taken to be white. Values in between make up the different shades of gray.

To represent color images, separate red, green and blue components must be specified for each of the source pixel 202 (assuming an RGB colorspace), and so the source pixel intensity 206 is actually a vector of three numbers. Often the three different components are stored as three separate "grayscale" images known as color planes (one for each of red, green and blue), which have to be recombined when displaying or processing.

The actual grayscale or color component intensities for each of the source pixel 202 may not actually be stored explicitly. Often, all that is stored for each pixel is an index into a colormap in which the actual source pixel intensity 206 or colors can be looked up.

Although simple 8-bit integers or vectors of 8-bit integers are the most common sorts of the source pixel intensity 206 used, some image formats support different types of value, for instance 32-bit signed integers or floating point values. Such values are extremely useful in image processing as they allow processing to be carried out on the image where the resulting source pixel intensities 206 are not necessarily 8-bit integers. If this approach is used then it is usually necessary to set up a colormap which relates particular ranges of pixel values to particular displayed colors.

The source image 102 is constructed by rows and columns of the source pixels 202. The numbers of the rows and columns of the source pixels 202 represent a source image resolution. A pixel row 210 starts from a vertical edge 212 to an opposite vertical edge 214 of the source image 102. The pixel row 210 contains a single line of the source pixels 202. The height of the pixel row 210 is the height of the source pixel 202. The width of the pixel row 210 is the width of the source image 102.

In the pixel row 210, the source pixel intensities 206 are constant in the dark and bright section, but increased transitionally in the blur step edge 208. The width of the blur step edge 208 indicates how blurred the source image 102 is. A blurrier source image has a wider blur step edge, and a sharper source image has a narrower blur step edge.

Figure 3:
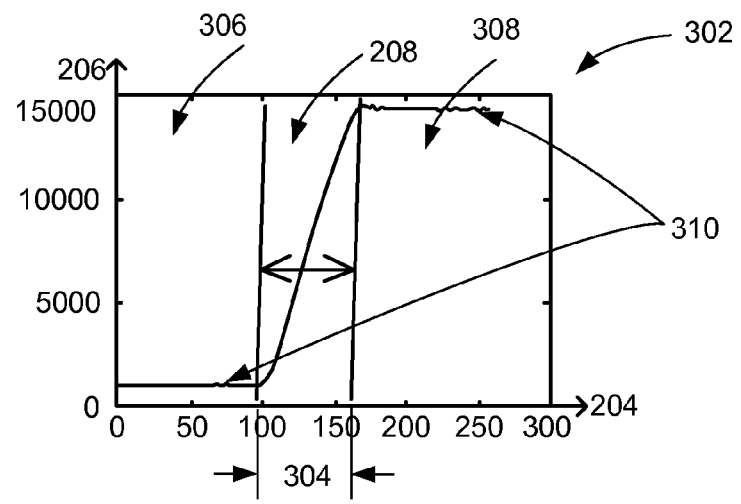
FIG. 3 is an intensity plot of the pixel row of FIG. 2.

Referring now to FIG. 3, therein is shown an intensity plot 302 of the pixel row 210 of FIG. 2. The pixel row 210 is constructed with a single line of the source pixels 202 of FIG. 2. Each of the source pixels 202 has the corresponding source pixel location 204 and source pixel intensity 206. The intensity plot 302 illustrates the source pixel intensities 206 with regard to the source pixel location 204.

The source pixel locations 204 start from the vertical edge 212 to the opposite vertical edge 214 of the source image 102 of FIG. 2. For example, the pixel row 210 can be constructed with a single line of 300 source pixels 202. The corresponding source pixel locations 204 starts from location 0 at the vertical edge 212 to location 300 at the opposite vertical edge 214.

The intensity plot 302 is plotted by connecting each of the source pixel intensity 206 with a continuous line. The magnitude of the source pixel intensity 206 can range from 0 to 15,000. Depends on the sensitivity of the image sensor 116 of FIG. 1, the range of outputs of the source pixel intensity 206 can be various. The outputs of the image sensor 116 can be digitized as n bits, wherein n is an integer. The digitized outputs of the image sensor 116 fits in the range of $0$-$(2^n-1)$. For example, when the outputs of the image sensor 116 are digitized as 14 bits, the source pixel intensities 206 are ranged within $0$-$(2^{14}-1)$, which is 0-16383.

A width 304 of the blur step edge 208 indicates how blurred the source image 102 is. The blurrier source image 102 has the wider width 304. In the blur step edge 208, the source pixel intensities 206 transitionally increase. A darker section 306 having lower source pixel intensities 206 and a brighter section 308 having higher source pixel intensities 206 are located at each side of the blur step edge 208. The source pixel intensities 206 are constant with slight glitches 310 in the darker section 306 and brighter section 308. The glitches 310 describe slight changes of the source pixel intensities 206.

Figure 4:
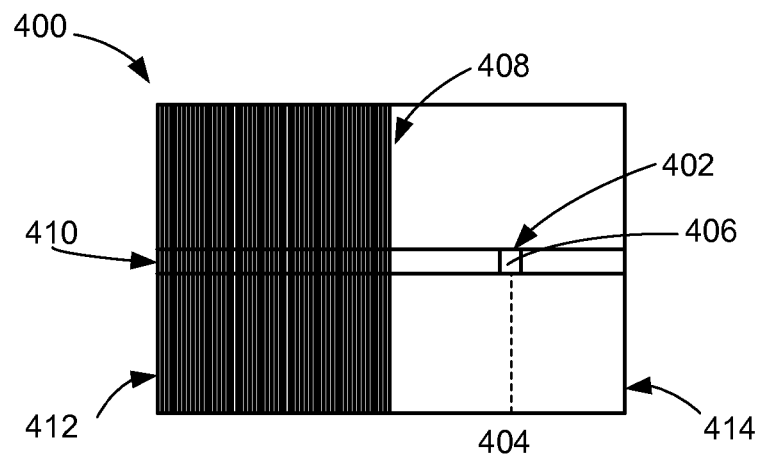
FIG. 4 is another example of the source image.

Referring now to FIG. 4, therein is shown another example of the source image 400. The source image 400 has source pixels 402, which are individual graphical elements can be produced by the image processing device 104 and displayed on the display device 114 of FIG. 1. The source pixels 400 can have characteristics including a source pixel location 404 and source pixel intensity 406. For example, the source image 400 can be a sharp image of the object 110 of FIG. 1 captured by a camera with the appropriate lens setting 108 of FIG. 1.

The source image 400 can be provided in a variety of ways. For example, the source image 400 can be directly formed by the optical lens system 106 of FIG. 1. In another example, the source image 400 can be received from the remote system via the file storage device, the network connection, or a combination thereof.

The source image 400 can have the blurriness 120 of FIG. 1 over the entire image. Some of the blurriness 120 can be small and invisible, for example, the blurriness 120 in the dark section and bright section are very small. However, the blurriness 120 in a blur step edge 408 is significantly visible.

The source pixel intensity 406 represents the brightness of the source pixel 402. The brighter source pixels 402 have greater values of the source pixel intensities 406. For example, a darker source pixel has lower source pixel intensity 406 than a brighter source pixel.

The source image 400 is constructed by rows and columns of the source pixels 402. The numbers of the rows and columns of the source pixels 402 represent a source image resolution. A pixel row 410 starts from a vertical edge 412 to an opposite vertical edge 414 of the source image 400. The pixel row 410 contains a single line of the source pixels 402. The height of the pixel row 410 is the height of the source pixel 402. The width of the pixel row 410 is the width of the source image 400.

In the pixel row 410, the source pixel intensities 406 are constant in the dark and bright section, but increased transitionally in the blur step edge 408. The width of the blur step edge 408 indicates how blurred the source image 400 is. A blurrier source image has a wider blur step edge, and a sharp source image has a narrower blur step edge.

Figure 5:
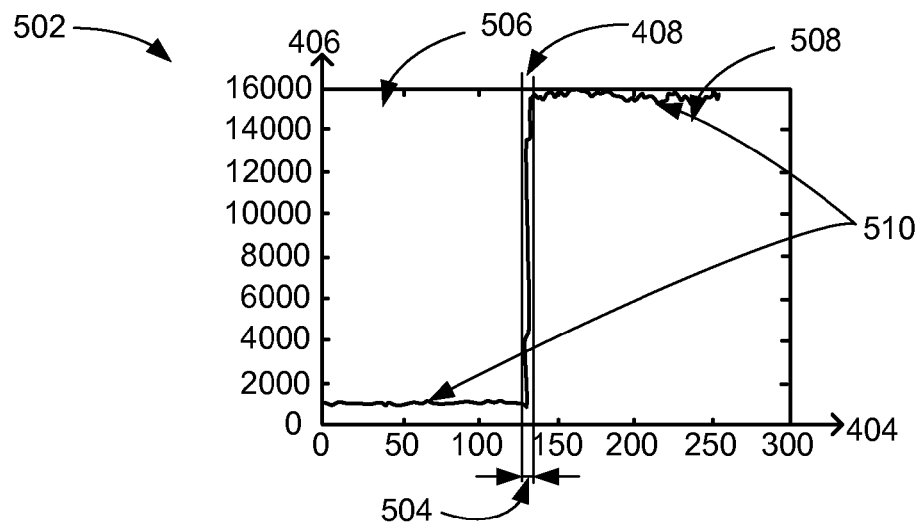
FIG. 5 is an intensity plot of the pixel row of FIG. 4.

Referring now to FIG. 5, therein is shown an intensity plot 502 of the pixel row 410 of FIG. 4. The pixel row 410 is constructed with a single line of the source pixels 402 of FIG. 2. Each of the source pixels 402 has the corresponding pixel location 404 and source pixel intensity 406. The intensity plot 502 illustrates the source pixel intensities 406 with regard to the source pixel location 404.

The source pixel location 404 starts from the vertical edge 412 to the opposite vertical edge 414 of the source image 400 of FIG. 4. For example, the pixel row 410 can be constructed with a single line of 300 source pixels 402. The corresponding pixel locations 404 starts from location 0 at the vertical edge 412 to location 300 at the opposite vertical edge 414.

The intensity plot 502 is plotted by connecting each of the source pixel intensity 406 with a continuous line. The magnitude of the source pixel intensity 406 can be ranging from 0 to 15,000. Depends on the sensitivity of the image sensor 116 of FIG. 1, the range of outputs of the source pixel intensities 406 can be various. The outputs of the image sensor 116 can be digitized as n bits, wherein n is an integer. The digitized outputs of the image sensor 116 fits in the range of 0-($2^n-1$). For example, when the outputs of the image sensor 116 are digitized as 14 bits, the source pixel intensity 406 is ranged 0-($2^{14}-1$), which is 0-16383.

A width 504 of the blur step edge 408 indicates how blurred the source image 400 is. The blurrier source image 400 has the wider width 504. In the blur step edge 408, the source pixel intensities 406 transitionally increase. A darker section 506 having lower source pixel intensities 406 and a brighter section 508 having higher source pixel intensities 406 are located at each side of the blur step edge 408. The source pixel intensities 206 are constant with slight glitches 510 in the darker section 506 and brighter section 508. The glitches 510 describe slight changes of the source pixel intensities 406.

Compared with the source image 102 of FIG. 2, the source image 400 has a shorter or sharper transition from the darker section 506 to the brighter section 508. The width 504 is less than the width 304 of FIG. 3. The source image 400 has a smaller width measurement than the source image 102 captured with the different lens setting 108 of FIG. 1.

Figure 6:
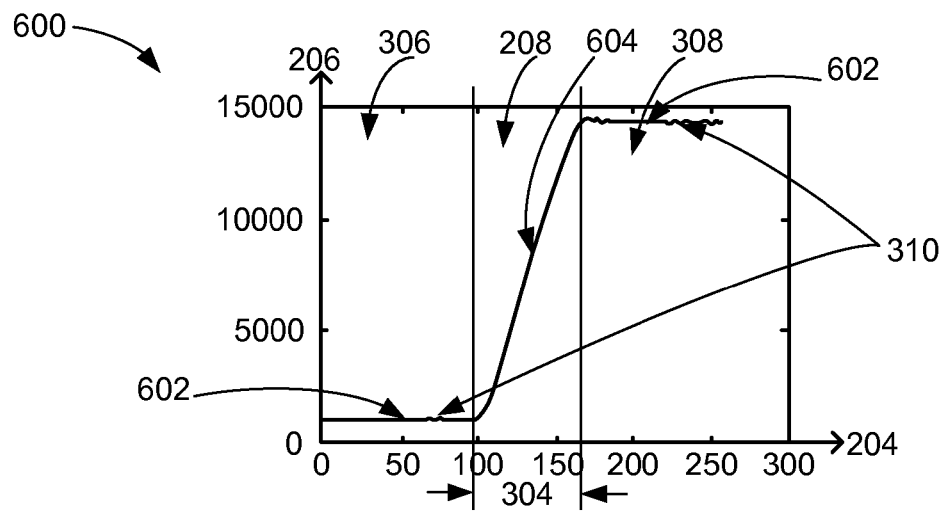
FIG. 6 is an edge profile of the pixel row of FIG. 2.

Referring now to FIG. 6, therein is shown an edge profile 600 of the pixel row 210 of FIG. 2. The edge profile 600 shows the source pixel intensities 206 with regard to the source pixel locations 204.

The edge profile 600 is a continuous line connecting the source pixel intensities 206 as a function of the source pixel location 204. The edge profile 600 shows changes of the source pixel intensities 206 between two adjacent source pixels 202 of FIG. 2. In the darker section 306 or brighter section 308, the source pixel intensities 206 have zero or slight changes. The edge profile 600 in the darker section 306 and the brighter section 308 are flat lines 602 with the glitches 310. In the blur step edge 208, the source pixel intensities 206 increase transitionally. The edge profile 600 in the blur step edge 208 is a slope 604 connecting the flat lines 602. The slope 604 describes that the changes of the source pixel intensity 206 between two adjacent source pixels 202 are linear and greater than zero. The width 304 of the slope 604 describes the magnitude of the blurriness 120 of FIG. 1. The greater width 304 indicates that the source image 102 of FIG. 2 is blurrier.

For example, the source image 102 shows the brightness of the source pixels 202 in the darker section 306 and brighter section 308 is constant with invisible changes. The source image 102 shows the source pixels 202 in the blur step edge 208 changes from dark to bright transitionally.

Figure 7:
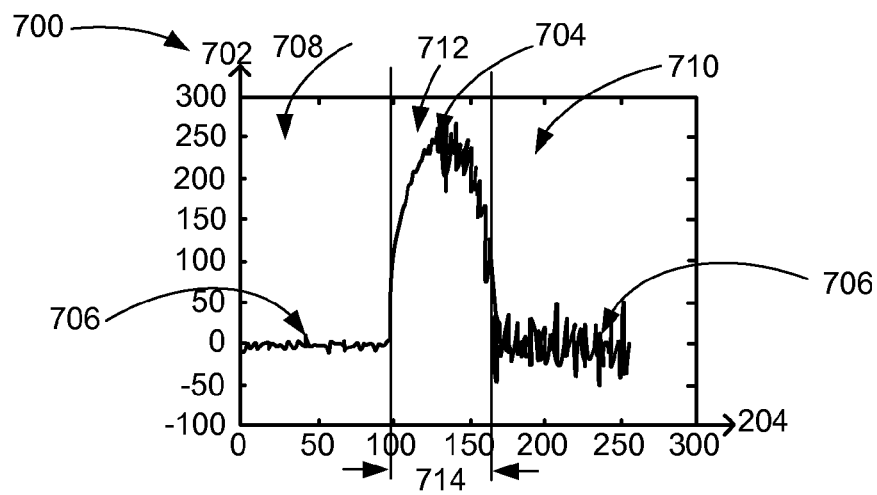
FIG. 7 is a gradient profile of the edge profile of FIG. 6.

Referring now to FIG. 7, therein is shown a gradient profile 700 of the edge profile 600 of FIG. 6. The gradient profile 700 shows changes 702 of intensity differences between two adjacent source pixels 202 of FIG. 2 in the direction of increasing the source pixel locations 204. The gradient profile 700 can be obtained by calculating first derivative of the edge profile 600 along the blur step edge 208.

The width 304 of FIG. 6 can be determined by calculating second moment of the gradient profile 700 in a function of form:

$$\mu_2 = \int_{-\infty}^{\infty} (x-c)^2 f(x) dx$$

Wherein: $\mu_2$ is the second moment,
x is a random variable within a range of $(-\infty, \infty)$
f(x) is a function of the variable x, and
c is a constant. $c = \int_{-\infty}^{\infty} x f(x) dx$ For example, in the gradient profile 700, x is the source pixel locations 204, and f(x) is the function of x within a range of $(-\infty, \infty)$. The gradient profile 700 graph is a symmetrical "bell" 704 having a peak in the middle of the source pixel location 204, and quickly falls off towards zero. The changes 702 describe the changes of the intensity differences of the adjacent source pixels 202. The glitches 310 of the edge profile 600 of FIG. 6 are amplified as noises 706 when calculating first derivative of the edge profile 600. The gradient profile 700 is a continuous line with plurality of the noise 706 extended to both sides of the continuous line. The noise 706 can be positive or negative while the magnitudes of the noises 706 are various.

Outputs of the image sensor 116 are not exactly proportional to light energy that hit the image sensor 116. The discrepancies of the real outputs and ideal outputs are the noises 706. The noises 706 can comprise various noises. The majority of the noises 706 are thermal noise of the image sensor 116. Thermal noise is the electronic noise generated by the thermal agitation of the charge carriers inside an electrical conductor at equilibrium, which happens regardless of any applied voltage. When limited to a finite bandwidth, thermal noise can have a nearly Gaussian amplitude distribution.

Corresponding to the source image 102 of FIG. 2, in a darker section 708, the changes 702 are distributed along the line of "0" with small magnitudes of the noises 706. When the changes 702 are distributed along the line of "0", the intensity differences of the adjacent source pixels 202 are constant zero with small changes. The changes 702 in the darker section 708 are concentrated at expected value μ=0 with the noises 706 above or below the line of "0". The noises 706 is above the expected value μ when the current intensity difference is greater than a previous one, or is below the expected value μ when the current intensity difference is less than the previous one.

In a brighter section 710, the changes 702 are distributed along the line of "0" with greater magnitudes of the noises 706. The changes 702 are distributed along the line of "0", and the intensity differences of the adjacent source pixels 202 are constant zero with greater changes. The changes 702 in the brighter section 710 are concentrated at expected value μ=0 with the noises 706.

Within a blur step edge 712, a transition of brightness changes from dark to bright along the direction of increasing the source pixel location 204. The changes 702 are distributed along the contour of the symmetrical "bell" 704. The intensity differences of the adjacent source pixels 202 are concentrated at the expected value μ along the contour of the symmetrical "bell" 704. The noises 706 can extend to both sides of the contour of the symmetrical "bell" 704, depends on the current intensity difference of the adjacent source pixels 202 is greater than or less than the previous one.

A width 714 of the blur step edge 712 can be measured by calculating second moment of the gradient profile 700. By measuring the width 714 of the blur step edge 712, the image processing system 100 can estimate the blurriness of the source image 102, and further retrieve the lens setting 108.

Small blurriness of the source image 102 is invisible. The small glitches 310 of the edge profile 600 are amplified when calculating first derivative of the edge profile 600, and shown as the noises 706 in the gradient profile 700. More and greater noises 706 can impact the accuracy of blurring measurement.

The gradient profile can be modeled with various functions. For example, the gradient profile 700 can be modeled with Gaussian function, in a function of form:

$$f(x) = a \frac{1}{\sigma\sqrt{2\pi}} \exp\left(-\frac{(x-u)^2}{2\sigma^2}\right)$$

Wherein:
x is the source pixel locations 204,
a, b, c and d are constants, and
f(x) is the gradient profile 700 modeled with Gaussian function.

Since the second moment of the gradient profile 700 is variance $\sigma^2$ when the gradient profile 700 is modeled with the Gaussian function, the width 714 equals variance $\sigma^2$.

Figure 8:
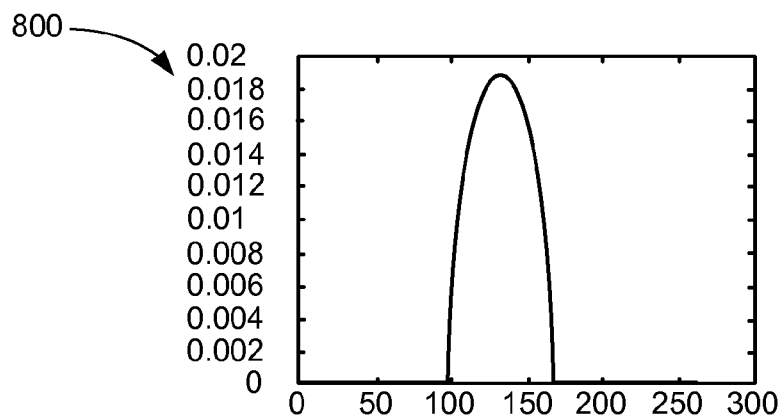
FIG. 8 is a smoothed gradient profile of the gradient profile of FIG. 7 after a smoothing process.

Referring now to FIG. 8, therein is shown a smoothed gradient profile 800 of the gradient profile 700 of FIG. 7 after a smoothing process. As discussed above, the gradient profile 700 has plurality of the noises 706 of FIG. 7, which are results of amplified glitches 310 of FIG. 3.

In order to improve noise robustness, the small gradient values less than a gradient threshold is eliminated from the gradient profile 700. The gradient threshold can be set within a range of 0-½. For example, when the gradient threshold is ⅛, the gradient values less than ⅛ of the maximal gradient can be removed from the gradient profile 700 before calculating the second moment thereof, wherein the maximal gradient is the greatest gradient value in the gradient profile 700.

The gradient threshold can be an experimental adjustable value within a range of 0-½. The experimental adjustable value that can be adapted to smooth out most of the noises 706 can be set as the gradient threshold.

Smoothing methods of the gradient profile 700 can be used to eliminate the noises 706. The gradient profile 700 can be modeled with Gaussian function, and then be smoothed out before normalization. The normalization may refer to adjustments which bring the entire probability distributions of adjusted gradient values into alignment. The width 714 of FIG. 7 can be measured by calculating the second moment of the smoothed gradient profile 800. Different object at different distance can have different smoothed gradient profiles under the same lens setting 108. The normalization can consolidate various smoothed gradient profiles as a unique smoothed gradient profiles 800 describing the lens setting 108.

It has been discovered, smoothing out the noises of the gradient profile can eliminate all the small gradients less than the gradient threshold. The blur measurement process needs less data to be processed, reduces calculation time, and improves the edge width measurement accuracy.

Figure 9:
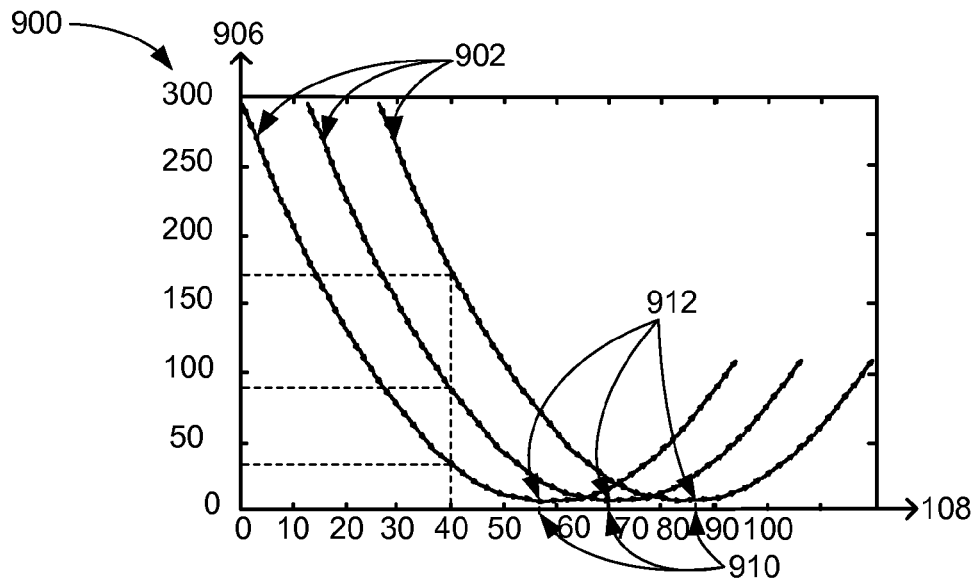
FIG. 9 is an edge width measures plot with regard to the lens settings.

Referring now to FIG. 9, therein is shown an edge width measures plot 900 with regard to the lens settings 108. The edge width measures plot 900 can include a group of parabolic curves 902. Each of the parabolic curves 902 has a corresponding depth of field (DOF). Depth of field (DOF) describes the distance between the nearest and farthest objects in a scene that appears acceptable sharp in the source image 102 of FIG. 1. The lens system 106 of FIG. 1 can precisely focus on the object 110 of FIG. 1 at a focus point. However the decrease in sharpness is gradual on each side of the focused point. Within the DOF, the blurriness is imperceptible under normal viewing conditions. Depending on the lens system 106 and other factors including aperture or sensor size, the DOF is reversely proportional to distance unit. The DOF is linear to 1/distance.

The group of the parabolic curves 902 describes edge width measurements 906 at sequences of the distance 118 of FIG. 1. When the object 110 moves, changes of the distance 118 causes the parabolic curve 902 moves horizontally. For each of the distances 118, the parabolic curves 902 can be plotted by calculating second moment of the smoothed gradient profile 800 of FIG. 8. For the sequences of the distance 118, a group of the parabolic curves 902 with identical shapes can be plotted.

After the edge width measure 906 is calculated, it can be fitted into one of the parabolic curves 902 at the current lens setting 108. Each of the lens settings 108 corresponds to one of the depths of field (DOF) and a sequences of an edge width measures 906 obtained by calculating second moment of the smoothed gradient profile 800.

The edge width measures plot 900 illustrates the edge width measures 906 of a vertical step edge sequence in the direction of increasing lens settings 108 of the same image processing device 104 of FIG. 1, capturing the same object 110 but at sequences of the distances 118. For each of the distance 118, the corresponding edge width measures 906 of the various lens settings 108 are pre-calculated and stored in the edge width measures plot 900 or look up tables.

At the distance 118, there is an optimal lens setting 910 having the least edge width measure 906, at a lowest point 912 of the parabolic curve 902. The image captured at the optimal lens setting 910 is the sharpest image. For example, when the source image 400 of FIG. 4 is captured with the optimal lens setting 910, the source image 400 is the sharpest source image and has the narrowest blur step edge.

The edge width measures 906 gradually increase from the lowest point 912 at both side of the optimal lens setting 910. The increased edge width measure 906 describes the increased blurriness 120 of FIG. 1 in the captured source image 102.

For the lens system 106 of FIG. 1, the corresponding edge width measure 906 is calculated along the vertical step edge. The image processing system 100 of FIG. 1 can fit the edge width measure 906 and the corresponding lens setting 108 in one of the parabolic curves 902 or the look up table. Through the parabolic curve 902 or the look up tables, an automatic focus system can retrieve the optimal lens setting 910 having the least edge width measure 906. The lens system 106 can be adjusted to the optimal lens setting 910 and capture a sharp image.

Figure 10:
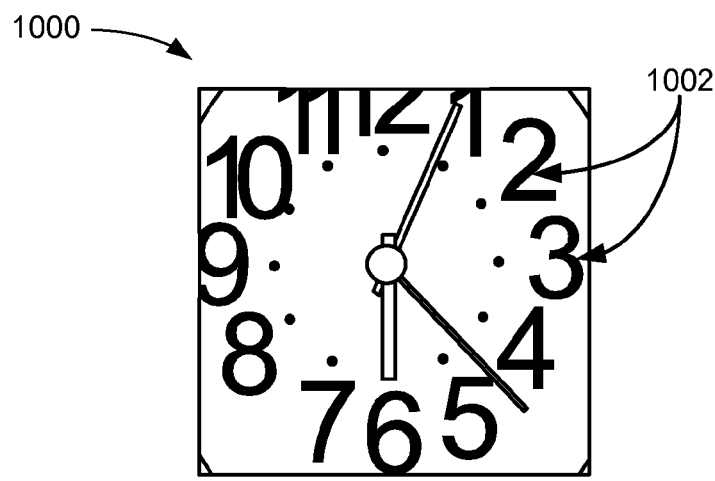
FIG. 10 is an example of an arbitrary image.

Referring now to FIG. 10, therein is shown an example of an arbitrary image 1000. The arbitrary image 1000 can have arbitrary blur step edges 1002 in the entire image and may point to various directions.

The arbitrary image 1000 can be provided in a variety of ways. For example, the arbitrary image 1000 can be directly formed by optical lens of the image processing device 104 of FIG. 1. In another example, the arbitrary image 1000 can be received from a remote system via a file storage device, a network connection, or a combination thereof.

Figure 11:
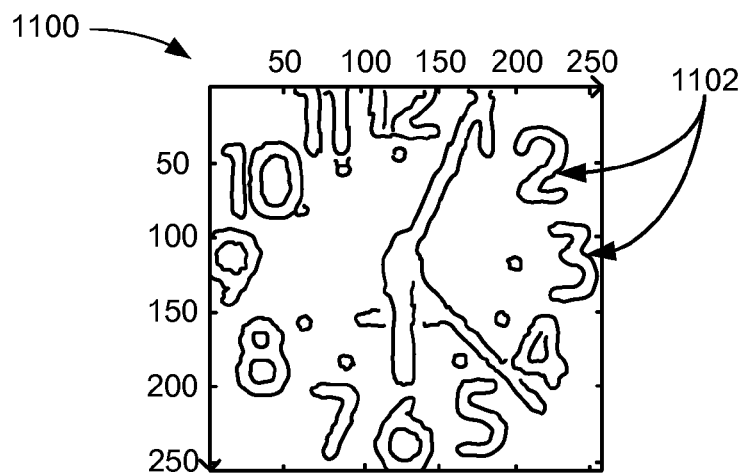
FIG. 11 is an arbitrary image of FIG. 10 after Canny edge detection.

Referring now to FIG. 11, therein is shown the arbitrary image 1000 of FIG. 10 after Canny edge detection. The Canny edge detection utilizes a Canny edge detector, which is an edge detection operator that uses a multi-stage algorithm to detect a wide range of edges in images. The Canny edge detection is a technique capable of identifying the sub-pixel location of a step edge based on basic device characteristics. The Canny edge detector can identify boundaries within the images that can be localized with high precision and accuracy.

The Canny edge detector is utilized to detect arbitrary edges 1102 with single pixel width at maximal gradient magnitude, such as the maximal gradient of FIG. 8. The arbitrary edges 1102 can point to arbitrary directions, such as vertical, horizontal or diagonal. Each of the horizontal or diagonal edge can be considered as an angled vertical step edge.

The result of the Canny edge detection is a binary image 1100 of the original arbitrary image 1000 with vertical, horizontal and diagonal edges in the blurred image 1100. Each of the pixels in the binary image 1100 has a horizontal locator x and a vertical locator y. The position of the pixel is a function of p(x, y), wherein x and y are integers.

Figure 12:
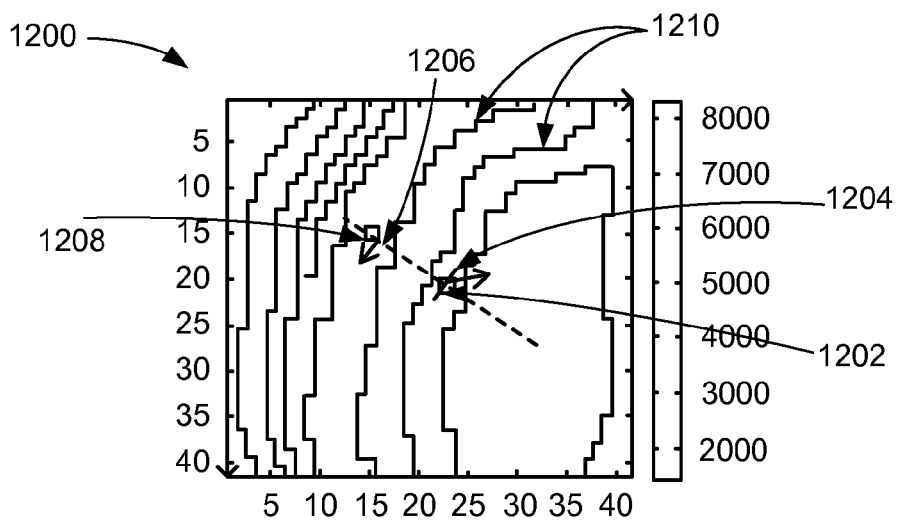
FIG. 12 is a gradient profile of a small portion of the binary image of FIG. 11.

Referring now to FIG. 12, therein is shown a gradient profile 1200 of a small portion of the binary image 1100 of FIG. 11. After running the Canny edge detection on the arbitrary image 1000 of FIG. 10, a detected edge pixel 1202 is detected along each of the arbitrary edges 1102 of FIG. 11. The detected edge pixels 1202 are the single pixels which has the maximal gradient of FIG. 11.

An edge direction 1204 is calculated at each of the detected edge pixels 1202 of the binary image 1100. For each of the edge pixels 1202 at location (x, y), edge directions of the edge pixels 1202 as functions of I(x, y), is calculated as a form of:

$$\text{argtan } 2(dy, dx),$$

where dy=I(x, y+1)−I(x, y−1),
dx=I(x+1, y)−I(x−1, y).

Perpendicular to each of the edge directions 1204, interpolated pixels 1208 are interpolated along an interpolation path 1206. In a similar fashion of calculating the gradient profile 700 of FIG. 7 for the vertical step edge, the gradient profile 1200 of the arbitrary edges 1102 is constructed by calculating first order derivative of the interpolated pixels 1208 for each of the detected edge pixels 1202.

The gradient profile 1200 illustrates the first order derivative of the detected edges pixels 1202 of the arbitrary image 1000, using the binary image 1100 as a location guidance of the detected edge pixels 1202. Different contours 1210 of the gradient profile 1200 describing magnitudes of gradients are plotted with regard to the pixel location p(x, y), wherein x and y are integers.

Random edge width measures are measured by calculating second moments of the gradient profile 1200. A smoothing process in a similar fashion of the smoothing process of FIG. 8 is adapted to remove small values of the gradients. After eliminating the noises of the gradient profile, the random edge width measures are measured by calculating second moments of the smoothed gradient profile.

Similar to the parabolic curves 902 of FIG. 9, the random edge width measures are calculated with regard to the lens settings 108 of FIG. 1. The optimal lens setting 910 of FIG. 9 can be retrieved at the least random edge width measure through a group of the random edge width measures or look up tables. The automatic focus system can adjust the lens system 106 of FIG. 1 to the optimal lens setting 910 and capture a sharp image.

In addition to application of the automatic focus process, the edge width blur measurement of a second embodiment of the current invention can be used to estimate the sharpness from a single image, and further retrieve the depth of field thereof.

Theoretically, the edge width blur measure is the variance of a line spread function. The edge width blur measure is proportional to the point spread function introduced by the lens system of the image processing device. The edge width blue measures are parabolic curves with regard to the lens settings. The image processing system can retrieve the depth of the image is captured, through the edge width blur measures look up tables or fitted in the parabolic curves. Additionally, the edge width blur measurement of a third embodiment of the current invention can be used to estimate the depths of field from multiple images.

The blur extents of two different blurred images can be measured using edge width blur measurement. The blur difference between the two blurred images can be calculated with various methods, for example, directly from the edge width blur measurement method. Since blur difference is linear with regard to the lens settings and the depths of field, the depths can be directly inferred from the edge width blur measures curves or look up tables.

Figure 13:
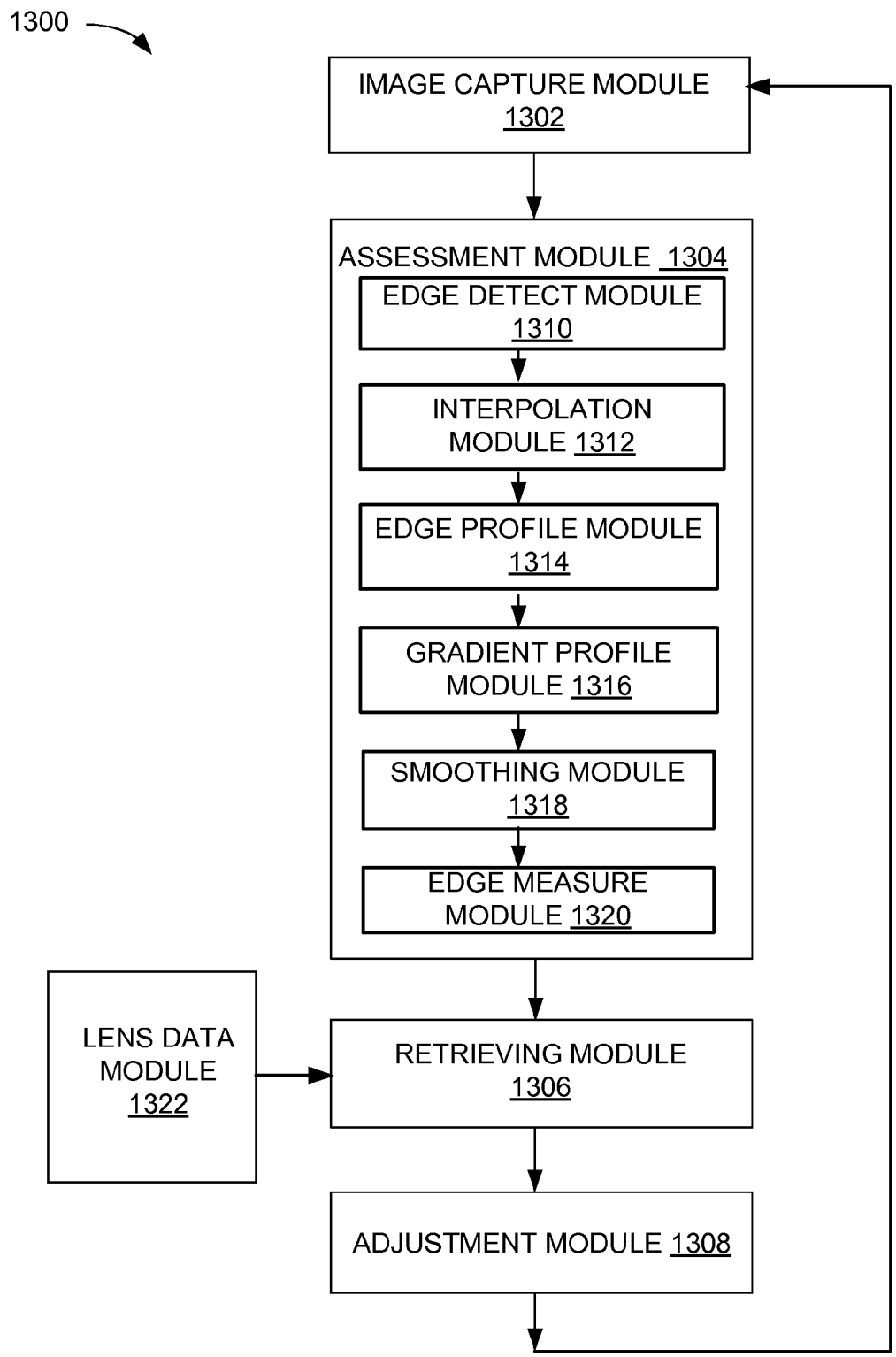
FIG. 13 is a control modules chart of the image processing system of FIG. 1.

Referring now to FIG. 13, therein is shown a control modules chart 1300 of the image processing system 100 of FIG. 1. The control modules chart 1300 can include an image capture module 1302, an assessment module 1304, a retrieving module 1306, and an adjustment module 1308. The assessment module 1304 can include an edge detect module 1310, an interpolation module 1312, an edge profile module 1314, a gradient profile module 1316, a smoothing module 1318, and an edge measure module 1320.

The image capture module 1302 can generate the source image 102 of FIG. 1. The image capture module captures the source image 102 of the object 110 with the image processing device 104, and displaying the source image 102 on the display device 114, of FIG. 1. The source image 102 having the source pixels 202 of FIG. 2 can be provided to the assessment module 1304 for evaluation.

Each of the source pixels 202 has the source pixel intensity 206 of FIG. 2 indicating the brightness of the source pixel 202 sensed by the image sensor 116 of FIG. 1. The blurriness 120 of FIG. 1 can be less perceptible in texture-less area, and can be more perceptible in the blur step edge 208 of FIG. 2, where the pixel intensities 206 changes transitionally from low to high. The pixel row 210 of FIG. 2 comprising a single row of the source pixels 202, crossing from one vertical edge to the opposite vertical edge.

The image capture module 1302 can capture the vertical step edge image or the arbitrary image 1000 of FIG. 10. The arbitrary image 1000 has edges including the vertical step edge of the source image 102, and the arbitrary blur step edges 1002 of FIG. 10, which can point to various directions.

The assessment module 1304 can evaluate the blurriness 120 of the source image 102 or arbitrary image 1000, and provide feedback to the retrieving module 1306. The assessment module 1304 can include the edge detect module 1310, which can detect the blur step edge 208 in the source image 102 and the arbitrary blur step edges 1002 of the arbitrary image 1000. The edge detect module 1310 can include the Canny edge detector of FIG. 11.

The arbitrary edges 1102 can point to arbitrary directions, including vertical, horizontal and diagonal. The Canny edge detector can be used to detect arbitrary edges 1102 with the single pixel width at the maximal gradient magnitude of FIG. 8, result in the binary image 1100 of FIG. 10. The binary image 1100 is provided to the interpolation module 1312 for interpolation.

The interpolation module 1312 can identify the edge pixels 1202, calculate the edge directions 1204, and interpolate the interpolated pixels 1208 along the interpolation path 1206 perpendicular to the edge direction 1204, of FIG. 12.

For example, for the blur step edge 208, the vertical edge is the edge direction, the pixel row 210 is interpolated horizontally, and perpendicular to the vertical edge direction of the blur step edge 208, the single pixel of the pixel row which has the maximal gradient magnitude is identified as the edge pixel.

For the arbitrary edges 1102, the edge pixels 1202 are the single pixels at where the arbitrary edges 1102 detected. At each of the edge pixels 1202, the edge direction 1204 is calculated on a computing device of the image processing system 100. The computing device can be embedded in the image processing device 104, or can be an individual device including a computer. Perpendicular to the edge directions 1204, the interpolation paths 1206 are created and the interpolation pixels 1208 are interpolated along the interpolation paths 1206.

The edge profile module 1314 can calculate and plot the source pixel intensities 206 of the pixel row 210 with regard to the source pixel locations 204 of FIG. 2 to generate the edge profile 600 of FIG. 6. The edge profile 600 describes the source pixel intensities 206 with regard to the source pixel locations 204. The edge profile 600 includes the flat lines 602 of FIG. 6 when the source pixel intensities 206 are constant and the slope 604 of FIG. 6 when the source pixel intensities 206 increase transitionally.

The edge profile 600 is a continuous line connecting the source pixel intensities 206 as a function of the source pixel location 204. The edge profile 600 shows changes of the source pixel intensities 206 between two adjacent source pixels 202.

The gradient profile module 1316 can calculate the gradient profile 700 of FIG. 7 of the edge profile 600, on the computing device of the image processing system 100. The gradient profile 700 illustrates changes 702 of FIG. 7 of the differences of the source pixel intensities 206 between two adjacent source pixels 202, in the direction of increasing the source pixel locations 204. The gradient profile 700 can be obtained by calculating first derivative of the edge profile 600 along the blur step edge 208.

The gradient profile 700 is a function of the source pixel location 204, and can be optional modeled with Gaussian function. when the gradient profile 700 is modeled with Gaussian function, the gradient profile 700 graph is a symmetrical "bell" 704 of FIG. 7 having a peak in the middle of the source pixel location 204, and quickly falls off towards zero. The changes 702 describe the changes of the intensity differences of the adjacent source pixels 202. The glitches 310 of FIG. 6 are amplified as the noises 706 of FIG. 7 when calculating first derivative of the edge profile 600. The gradient profile 700 is a continuous line with plurality of the noise 706 oscillating above or below the mean value or expected value $\mu$ of FIG. 7.

In the darker section 708 of FIG. 7, the changes 702 are distributed along the line of "0" with small magnitudes of the noises 706. When the changes 702 are distributed along the line of "0", the intensity differences of the adjacent source pixels 202 are constant with small changes, with the expected value $\mu=0$. The noises 706 can be above the expected value $\mu$ when the current intensity difference is greater than a previous one, or can be below the expected value $\mu$ when the current intensity difference is less than the previous one.

In the brighter section 710 of FIG. 7, the changes 702 are distributed along the line of "0" with greater magnitudes of the noises 706. The intensity differences of the adjacent source pixels 202 are constant with greater changes in the brighter section 710. The noise 706 can be above the expected value $\mu=0$ when the current intensity difference is greater than a previous one, or can be below the expected value $\mu=0$ when the current intensity difference is less than the previous one.

In the blur step edge 712 of FIG. 7, a transition of brightness occurs from dark to bright in the direction of increasing the source pixel location 204. The changes 702 are distributed along the contour of the symmetrical "bell" 704. The noises 706 can extend to both sides of the expected value $\mu$ depending on the current intensity difference is greater than or less than the previous one, wherein the expect value $\mu$ follows the contour of the symmetrical "bell" 704.

The smoothing module 1316 can eliminate the noises 706 of the gradient profile 700 to generate the smoothed gradient profile 800 of FIG. 8. The noises 706 can impact the accuracy of the edge width measurement 906 of FIG. 9 and increase the data amount need to be processed. To improve noise robustness, the small gradient values less than the gradient threshold of FIG. 8 are eliminated from the gradient profile 700.

The gradient threshold can be an adjustable experimental value within a range of 0-½. The value that can be adapted to smooth out most of the noises 706 is set as the gradient threshold. For example, when the gradient threshold is set to ⅛, any gradient less than ⅛ of the maximal gradient can be eliminated from the gradient profile 700, wherein the maximal gradient is the greatest gradient value in the entire gradient profile 700. The small gradient values can be removed from the gradient profile 700 before calculating the second moment thereof.

The smoothing methods, including the normalization of the gradient profile 700, can be used to eliminate the noise 706. The gradient profile 700 can be modeled with Gaussian function before the normalization. The normalization may refer to adjustments which bring the entire probability distributions of adjusted gradient values into alignment. The smoothed gradient profile 800 is a continuous smooth line without the noises 706.

It has been discovered, smoothing module can smooth out the noises of the gradient profile eliminates all the small gradients less than the gradient threshold. The smoothing process can reduce the data amount need to be processed, and further reduces the processing time and improve the edge width measurement accuracy.

The edge measure module 1320 can measure the width 714 of FIG. 7 by calculating second moment of the smoothed gradient profile 800. The width 714 represents the blurriness of the source image. The wider width 714 indicates the source image is blurrier. The narrower width 714 indicates the source image is sharper. For the same image processing device, each of the edge width measures 906 has the corresponding lens setting 108. By calculating the edge width measures 906, the corresponding lens setting 108 can be retrieved.

A lens data module 1322 can generate the edge width measures plot 900, which can include a group of parabolic curves 902 or look up tables of FIG. 9 with regard to the lens settings 108 having the corresponding depth of field (DOF) of FIG. 9. The edge width measures plot 900 can be pre-calculated and stored in the computing device, which can include a data storage unit.

The edge width measures 906 are illustrated as the parabolic curves 902, with regard to the lens settings 108. When the object 110 moves, the distance 118 changes resulting that the parabolic curve 902 moves horizontally. For sequences of the distance 118, a group of the parabolic curves 902 with identical shapes can be plotted.

The image processing devices 104 can have its unique edge width measures plot 900 because of the unique lens system 106 thereof. The stored pre-calculated edge width measures can be a group of parabolic curves 902 or look up tables. The stored pre-calculated edge width measures may not be interchangeable to other image processing devices.

Each of the parabolic curves 902 has a lowest point 912 of FIG. 9 having the corresponding optimal lens setting 910 of FIG. 9. The edge width measures 906 of the parabolic curve 902 are gradually increase from the lowest point 912 at both side of the optimal lens setting 910. The increased edge width measure 906 describes the increased blurriness 120 in the captured source image 102. The lowest edge width measure 906 describes the least blurriness. The source image captured with the optimal lens setting 910 is the sharpest image that the image processing device can produce.

The retrieving module 1306 can retrieve the depth of the source image 102. By fitting the edge width measures 906 into the stored pre-calculated parabolic curves 902 or the look up tables, the retrieving module 1306 can retrieve the corresponding DOF, and further retrieve the lens setting 108 of the source image 102 from one of the parabolic curves 902.

The adjusting module 1308 can adjust the lens setting 108 according to the optimal lens setting 910 retrieved in the retrieve module 1306. The image capture module 1302 can capture a sharp image with the optimal lens setting 910.

Figure 14:
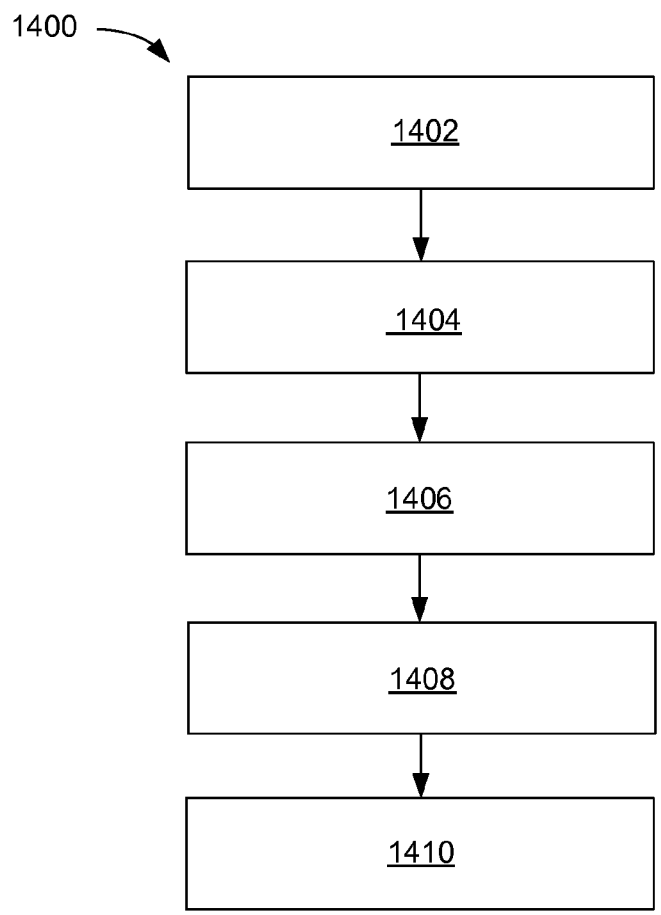
FIG. 14 is a flow chart of a method of manufacturing of the image processing system in a further embodiment of the present invention.

Referring now to FIG. 14, therein is shown a flow chart of a method 1400 of operation of the image processing system 100 of FIG. 1 in a further embodiment of the present invention. The method includes providing an image processing device in a block 1402; receiving a source image on the image processing device in a block 1404; detecting an edge of the source image in a block 1406; calculating an edge width measure of the edge in a block 1408; and retrieving a depth from the edge width measure in a block 1410.

It has been discovered that the embodiment of present invention provides method of estimating edge width measurement in a fast and accurate fashion. The method of the embodiment of present invention needs less image information to process results in a simpler and faster method. The method provides more accurate edge width measurement to an automatic focus system to retrieve a more appropriate lens setting to capture a sharper image, or to retrieve a more accurate depth of the image. Reduced processing time improves the operation speed of the automatic focus system.

It has been discovered that the present invention thus has numerous aspects. The present invention valuably supports and services the historical trend of simplifying systems and increasing performance. These and other valuable aspects of the present invention consequently further the state of the technology to at least the next level.

Thus, it has been discovered that the image processing system of the present invention furnishes important and heretofore unknown and unavailable solutions, capabilities, and functional aspects for efficiently auto-segmenting images. The resulting processes and configurations are straightforward, cost-effective, uncomplicated, highly versatile and effective, can be surprisingly and unobviously implemented by adapting known technologies, and are thus readily suited for efficiently and economically manufacturing image processing devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
    providing an image processing device having a lens system;
    receiving a source image on the image processing device;
    detecting an edge of the source image;
    calculating an edge profile of the edge, the edge profile having an amplified glitch;
    calculating a gradient profile of the edge profile based on the amplified glitch;
    eliminating the amplified glitch by eliminating a gradient value, which is less than a gradient threshold, from the calculated gradient profile to create a smoothed gradient profile;
    calculating an edge width measure of the edge from the smoothed gradient profile;
    determining a parabolic curve from the calculated edge width measure;
    retrieving a depth from a least edge width measure which is a lowest point of the determined parabolic curve; and
    adjusting the lens system to the depth for capturing an image of an object.

2. The method as claimed in claim 1 wherein detecting the edge includes detecting a vertical step edge and an arbitrary edge.

3. The method as claimed in claim 1 further comprising:
    pre-calculating an edge width measure;
    storing the pre-calculated edge width measure in an edge width measures plot or look up tables; and
    retrieving a lens setting through the edge width measures plot or the look up tables.

4. The method as claimed in claim 1 further comprising:
    calculating an edge direction of the edge;
    interpolating an interpolated pixel along an interpolation path; and
    calculating the gradient profile of the interpolated pixel.

5. A method of operation of an image processing system comprising:
    providing an image processing device with a lens system;
    receiving a source image captured by the image processing device;
    detecting an edge of the source image;
    calculating an edge profile of the edge, the edge profile having an amplified glitch;
    calculating a gradient profile of the edge profile based on the amplified glitch;
    eliminating the amplified glitch by eliminating a gradient value, which is less than a gradient threshold, from the calculated gradient profile to create a smoothed gradient profile;
    calculating an edge width measure of the edge by calculating a second moment of the smoothed gradient profile;
    retrieving an optimal lens setting having a least edge width measure which is a lowest point of a parabolic curve, wherein the parabolic curve is one of a plurality of parabolic curves plotted based on the calculated edge width measure; and
    adjusting the lens system to a depth based on the optimal lens setting for capturing an image of an object.

6. The method as claimed in claim 5 wherein detecting the edge includes running a Canny edge detection to detect a vertical step edge and an arbitrary edge.

7. The method as claimed in claim 5 further comprising:
    calculating first derivative of the edge profile to create the gradient profile;
    smoothing out a noise of the gradient profile by eliminating a small gradient under a gradient threshold, and
    calculating a second moment of the smoothed gradient profile to create the edge width measure.

8. The method as claimed in claim 5 further comprising:
    pre-calculating an edge width measure;
    storing the pre-calculated edge width measure in an edge width measures plot or look up tables; and
    retrieving the optimal lens setting through the edge width measures plot or the look up tables.

9. The method as claimed in claim 5 further comprising:
    detecting an edge pixel of the edge;
    calculating an edge direction of the edge pixel;
    interpolating an interpolated pixel along an interpolation path perpendicular to the edge direction; and
    calculating the gradient profile of the interpolated pixel along the interpolation path.

10. An image processing system comprising:
    an image processing device having a lens system;
    an image capture module for capturing a source image on the image processing device; an assessment module for detecting an edge of the source image;
    an edge profile module for calculating an edge profile of the edge, the edge profile having an amplified glitch;
    a gradient profile module for calculating a gradient profile of the edge profile based on the amplified glitch;
    a smoothing module for eliminating the amplified glitch by eliminating a gradient value, which is less than a gradient threshold, from the calculated gradient profile to create a smoothed gradient profile;
    an edge measure module for measuring an edge width measure of the smoothed gradient profile;
    a retrieving module for retrieving a depth of field from a least edge width measure which is a lowest point of a parabolic curve, wherein the parabolic curve is plotted based on the edge width measure; and
    an adjusting module for adjusting the lens system to the depth for capturing an image of an object.

11. The system as claimed in claim 10 wherein the assessment module is for detecting the edge includes a vertical step edge and an arbitrary edge.

12. The system as claimed in claim 10 further comprising:
    an lens data module for calculating and storing an edge width measures plot or look up tables; and
    wherein:
    the retrieving module is for retrieving the depth through the edge width measures plot or the look up tables.

13. The system as claimed in claim 10 further comprising:
    an edge detect module for detecting an edge direction of the edge; and
    an interpolation module for interpolating an interpolated pixel along an interpolation path perpendicular to the arbitrary edge direction; and
    wherein:
    the edge profile module is for generating the gradient profile of the interpolated pixel.

14. The system as claimed in claim 10 wherein:
    the retrieving module is for retrieving an optimal lens setting having a least edge width measure.

15. The system as claimed in claim 14 wherein the assessment module is for detecting the edge includes a Canny edge detection for detecting a vertical step edge and an arbitrary edge.

16. The system as claimed in claim 14 wherein:
    the gradient profile module is for generating the gradient profile of the edge profile, wherein the gradient profile is first derivative of the edge profile; and further comprising:

the smoothing module for generating the smoothed gradient profile having a gradient value greater than the gradient threshold; and the edge measure module for measuring the edge width measure of the smoothed gradient profile, wherein the edge width measure is a second moment of the smoothed gradient profile.

17. The system as claimed in claim 14 further comprising:

a lens data module for calculating and storing an edge width measures plot or look up tables of the edge width measure; and wherein:

the retrieve module is for retrieving the optimal lens setting through the edge width measures plot or the look up tables.

18. The system as claimed in claim 14 further comprising:

an edge detect module for detecting an edge pixel of the edge, and calculating an arbitrary edge direction of the edge pixel; and an interpolation module for interpolating an interpolated pixel along an interpolation path perpendicular to the arbitrary edge direction; and wherein:

the edge profile module is for generating the gradient profile of the interpolated pixel along the interpolation path.

\* \* \* \* \*